US008106966B2

United States Patent
Chou et al.

(10) Patent No.: US 8,106,966 B2
(45) Date of Patent: Jan. 31, 2012

(54) DIGITAL IMAGE CAPTURE DEVICE AND BRIGHTNESS CORRECTION METHOD THEREOF

(75) Inventors: Chan-Min Chou, Banciao (TW); Chung-Pin Lu, Taipei County (TW)

(73) Assignee: Altek Corporation, Hsinchu (TW)

( * ) Notice: Subject to any disclaimer, the term of this patent is extended or adjusted under 35 U.S.C. 154(b) by 365 days.

(21) Appl. No.: 12/420,703

(22) Filed: Apr. 8, 2009

(65) Prior Publication Data

US 2010/0149380 A1 Jun. 17, 2010

(30) Foreign Application Priority Data

Dec. 17, 2008 (TW) ................................ 97149268 A (51) Int. Cl.
*H04N 9/68* (2006.01)
(52) U.S. Cl. .................. 348/234; 348/222.1; 348/231.3; 348/251
(58) Field of Classification Search ............... 348/222.1, 348/231.3, 234, 251, 348, 349
See application file for complete search history.

(56) References Cited

U.S. PATENT DOCUMENTS

| 6,094,536 A * | 7/2000 | Harada .......................... 396/121 |
| 2003/0123870 A1* | 7/2003 | Yoshida et al. ................ 396/121 |
| 2005/0259278 A1* | 11/2005 | Toura .............................. 358/1.9 |
| 2006/0087702 A1* | 4/2006 | Satoh et al. .................... 358/461 |
| 2009/0213243 A1* | 8/2009 | Funamoto .................. 348/223.1 |

* cited by examiner

*Primary Examiner* — Gevell Selby
(74) *Attorney, Agent, or Firm* — Apex Juris, pllc; Tracy M. Heims (57) ABSTRACT

A digital image capture device and a brightness correction method thereof are described. The digital image capture device is adapted to correct the brightness value of a shot object in a digital image through the compensation of a strobe during shooting. The method includes setting a shooting magnification of the digital image capture device to the shot object; capturing a pre-shot image at least including the image of the shot object; triggering a strobe to emit a main flash onto the shot object, so as to shoot a digital image; setting a plurality of light measuring areas in the digital image; calculating a corresponding object distance of the shot object from each of the light measuring areas; establishing a shading table according to each of the object distances; and loading the shading table to adjust the brightness value of each of the light measuring areas in the digital image.

4 Claims, 8 Drawing Sheets

DIGITAL IMAGE CAPTURE DEVICE AND BRIGHTNESS CORRECTION METHOD THEREOF

CROSS-REFERENCE TO RELATED APPLICATIONS

This non-provisional application claims priority under 35 U.S.C. §119(a) on Patent Application No(s). 097149268 filed in Taiwan, R.O.C. on Dec. 17, 2008 the entire contents of which are hereby incorporated by reference.

BACKGROUND OF THE INVENTION

1. Field of Invention

The present invention relates to a digital image capture device and a brightness correction method thereof, and more particularly to a method for correcting the brightness value of a shot object at different distances and a digital image capture device thereof.

2. Related Art

With the development of digital cameras, photography is no longer an expensive consumption. Users may shoot desired images at will to record a memorial moment or scene. Due to physical properties, the lens set in the digital image capture device may cause the problem of non-uniform brightness distribution during the imaging of the shot object under the light source. In other words, the center of the digital image is brighter than the periphery. Meanwhile, if the strobe is used for compensating the brightness, the non-uniform brightness distribution becomes even more apparent. The reason is that the strobe reflects all the lights from the light source onto the shot object through the reflecting plate, and the strobe and the lens set are located at different positions, so that the shot object is under varied impacts due to its distance from the camera. If the digital image capture device is closer to the shot object, the brightness distribution of the digital image is increased, and vice versa. In order to solve the above problem of brightness distribution, a shading table is provided, in which a digital image is represented by a two-dimensional array and brightness compensation is performed on the digital image through digital gain.

Figure 1:
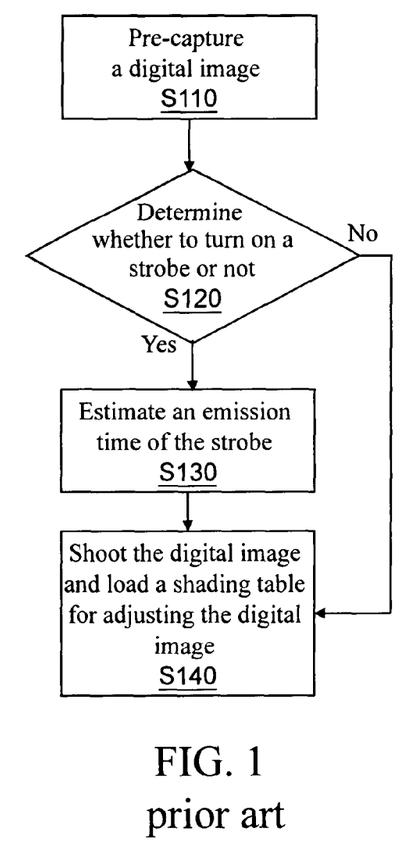
FIG. 1 is a schematic view of a conventional brightness adjustment method.

FIG. 1 is a schematic flow chart of the prior art. A digital image is pre-captured (Step S110). It is determined whether to turn on a strobe or not (Step S120). If the strobe is shot, an emission time of the strobe is estimated (Step S130). If the strobe is not shot, the digital image is directly shot and a shading table is loaded for adjusting the digital image (Step S140). If only a shading table is applied to all the shooting environments, the problem that the long-shot gain is too much while the close-shot gain is insufficient may occur to the digital image at different focusing object distances, and vice versa. In this manner, the modified digital image appears unnatural.

SUMMARY OF THE INVENTION

Accordingly, to solve the above problem, the present invention is mainly directed to a brightness correction method of a digital image capture device, in which the brightness of a shot object in a digital image is corrected when a strobe is used to shoot the image.

In order to achieve the above objective, the present invention provides a brightness correction method of a digital image capture device, which includes capturing a pre-shot image at least including an image of a shot object; triggering a strobe to emit a main flash onto the shot object, so as to shoot a digital image; setting a plurality of light measuring areas in the digital image; calculating a corresponding object distance of the shot object from each of the light measuring areas; establishing a shading table according to each of the object distances; and loading the shading table to adjust the brightness of each of the light measuring areas in the digital image.

In another aspect, the present invention is further directed to a brightness correction method of a digital image capture device, which is adapted to correct the brightness of a shot object in a digital image shot by using a strobe.

In order to achieve the above objective, the present invention provides a brightness correction method of a digital image capture device, which includes capturing a digital image including at least one frame of a shot object; setting a plurality of light measuring areas in the digital image, and calculating a corresponding object distance of the shot object from each of the light measuring areas; loading a corresponding shading table according to the corresponding object distance of the shot object in each of the light measuring areas; and adjusting the brightness value of each of the light measuring areas in the digital image according to the shading table.

In still another aspect, the present invention is directed to a digital image capture device with brightness correction, which is adapted to correct the brightness of a shot object in a digital image shot by using a strobe.

In order to achieve the above objective, the present invention provides a digital image capture device with brightness correction, which includes a lens set, a strobe, a light sensing element, a storage unit, and a processing unit. The lens set is used to adjust a focal length of a shot object. The light sensing element is electrically connected to the lens set, for receiving an image signal of the shot object through the lens set. The storage unit is electrically connected to the light sensing element, for storing the digital image received by the light sensing element and a shading table. The processing unit is electrically connected to the strobe, the light sensing element, and the storage unit, for adjusting an output value of the strobe according to the shading table established through pre-shooting.

As described above, the present invention provides a method for correcting the brightness of a digital image and a digital image capture device thereof based on different light measuring areas in the digital image. According to the distances from the light measuring areas to the shot object, the digital image capture device respectively sets a dedicated brightness correction value for each light measuring area and records the brightness correction values to a shading table. Directing to shot objects with different distances/shooting magnifications, the shading table with the corresponding distance is loaded to prevent over-exposure of some areas of the digital image when a single gain value is employed to compensate the whole digital image.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 2:
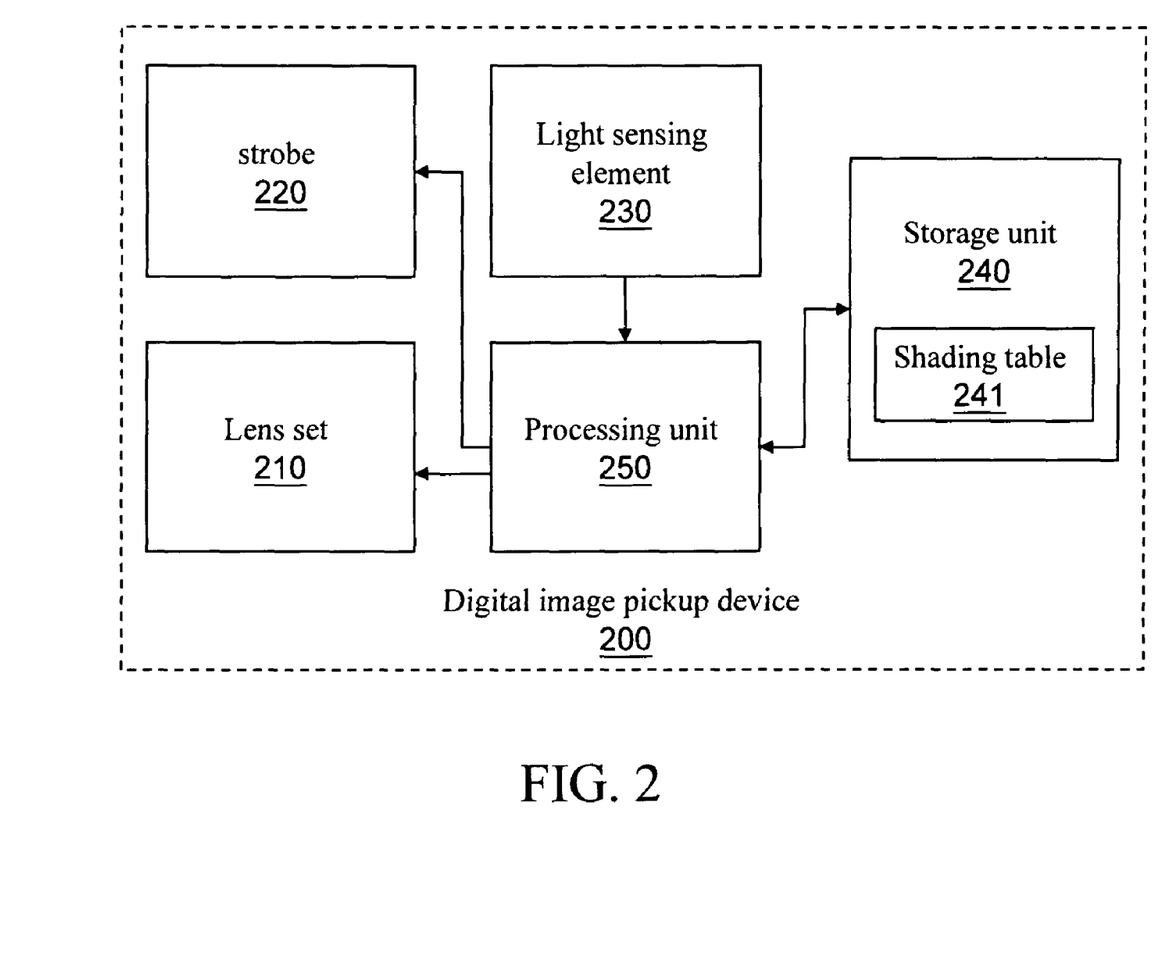
FIG. 2 is a schematic architectural view of the present invention.

FIG. 2 is a schematic architectural view of the present invention. The digital image capture device 200 of the present invention includes a lens set 210, a strobe 220, a light sensing element 230, a storage unit 240, and a processing unit 250. The lens set 210 is used to adjust a focal length and a zoom ratio of a shot object. The light sensing element 230 is electrically connected to the lens set 210, for receiving an image signal of the shot object through the lens set 210. The storage unit 240 is electrically connected to the light sensing element 230, for storing the digital image received by the light sensing element 230 and a shading table 241. The processing unit 250 is electrically connected to the strobe 220, the light sensing element 230, and the storage unit 240, for adjusting an output value of the strobe 220 according to the shading table 241 established through pre-shooting.

Figure 3A:
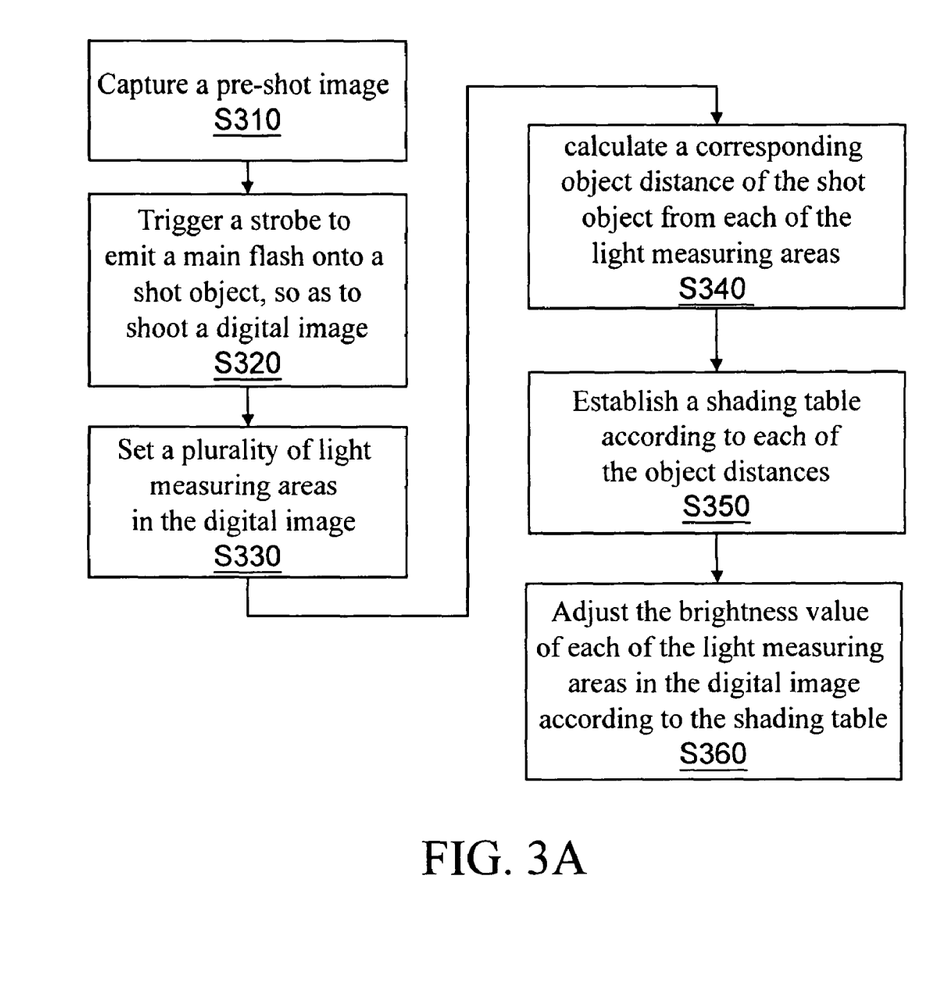
FIG. 3A is a schematic flow chart of the operation of the present invention.

In order to explicitly describe the operation of the present invention, a schematic flow chart of the operation of the present invention is shown in FIG. 3A, and the operation of the present invention includes the following steps.

A pre-shot image at least including an image of a shot object is captured (Step S310).

A strobe is triggered to emit a main flash onto the shot object, so as to shoot a digital image (Step S320).

A plurality of light measuring areas is set in the digital image (Step S330).

A corresponding object distance of the shot object is obtained from each of the light measuring areas (Step S340). A brightness difference value between the reflection level of the shot object and the pre-shot image in the digital image is obtained when the strobe is triggered to shoot the object. Then, the object distance of the shot object in each of the light measuring areas is determined according to the brightness difference value.

A shading table is established according to each of the object distances (Step S350).

Finally, the brightness value of each of the light measuring areas in the digital image is adjusted according to the shading table (Step S360).

Figure 3B:
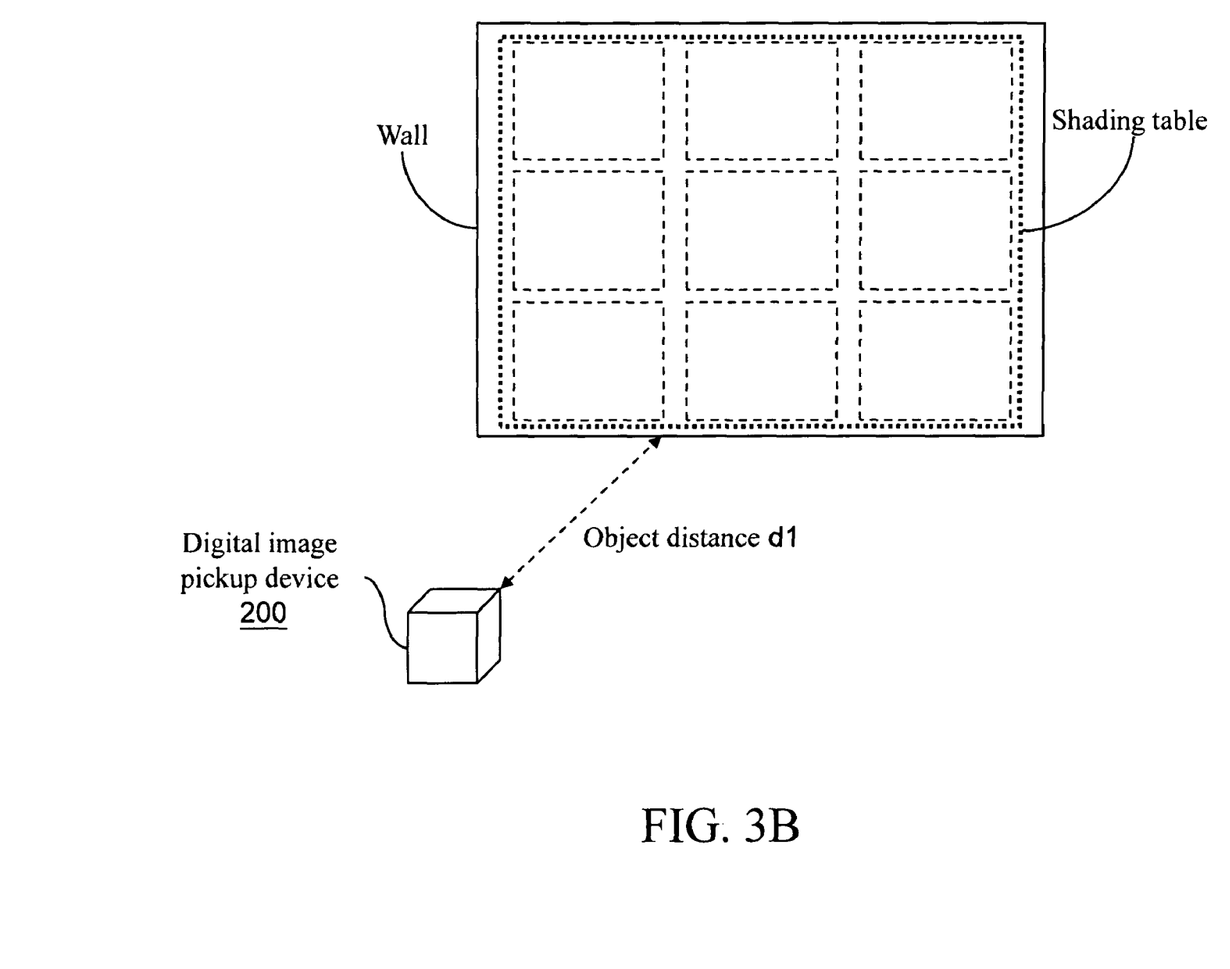
FIG. 3B is a schematic view of an implementation aspect with different object distances.
Figure 3C:
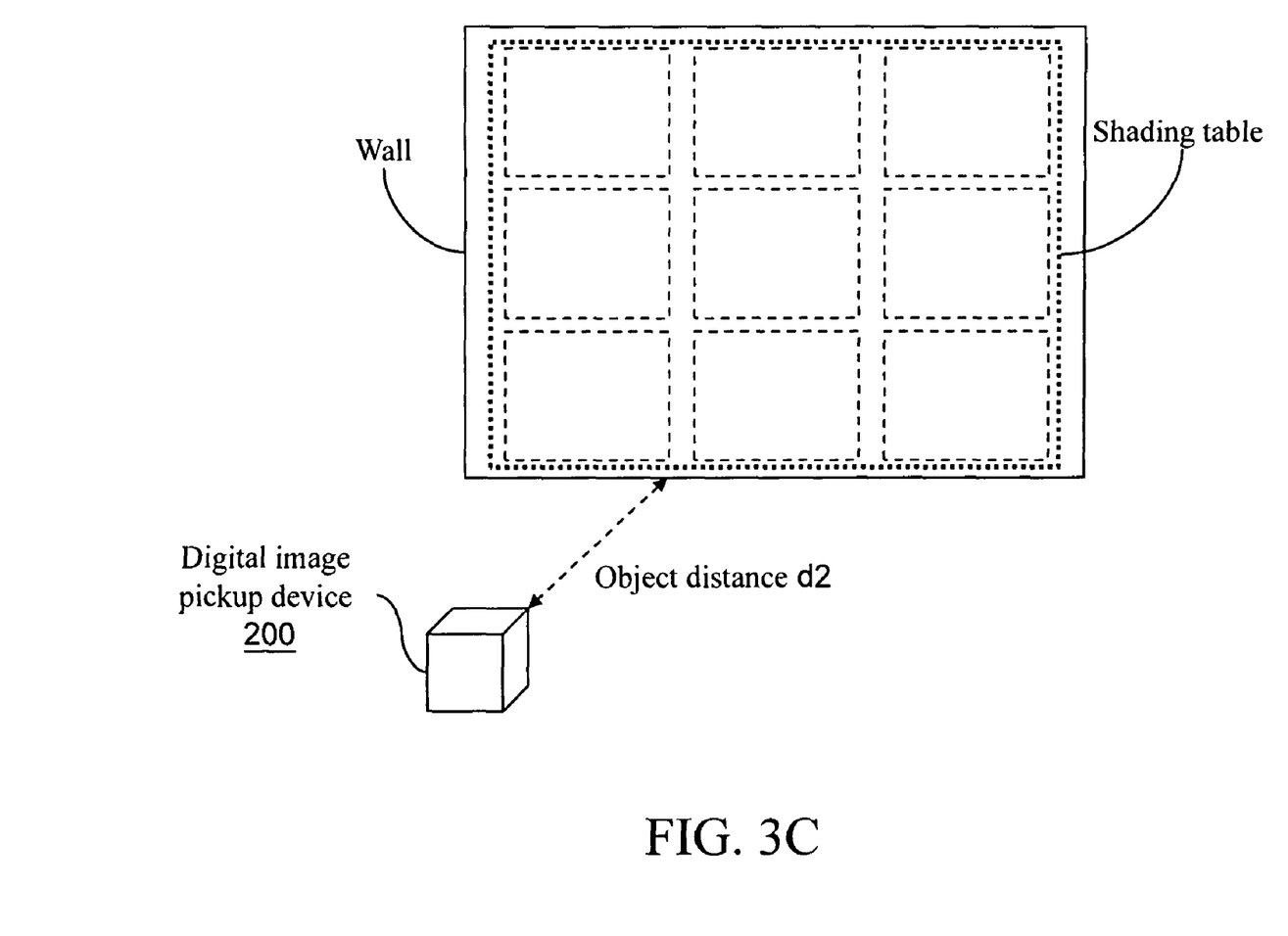
FIG. 3C is a schematic view of an implementation aspect with different object distances.

In order to explicitly describe the establishment of the shading table, the following method is provided, and the present invention is not limited thereto. FIGS. 3B and 3C are schematic views of implementation aspects with different object distances. Both in FIGS. 3B and 3C, a wall is shot. In FIG. 3B, an object distance between the digital image capture device and the wall is d1, and in FIG. 3C, an object distance between the digital image capture device and the wall is d2. Several digital images are shot at different object distances (for example, at an interval of 30 cm). Then, a shading table is established according to the decreasing level from the center to the periphery of the digital image with different object distances. Besides the above method of shooting a planar wall for establishing a shading table, images of persons or articles at different object distances may also be shot to establish a shading table.

Figure 3D:
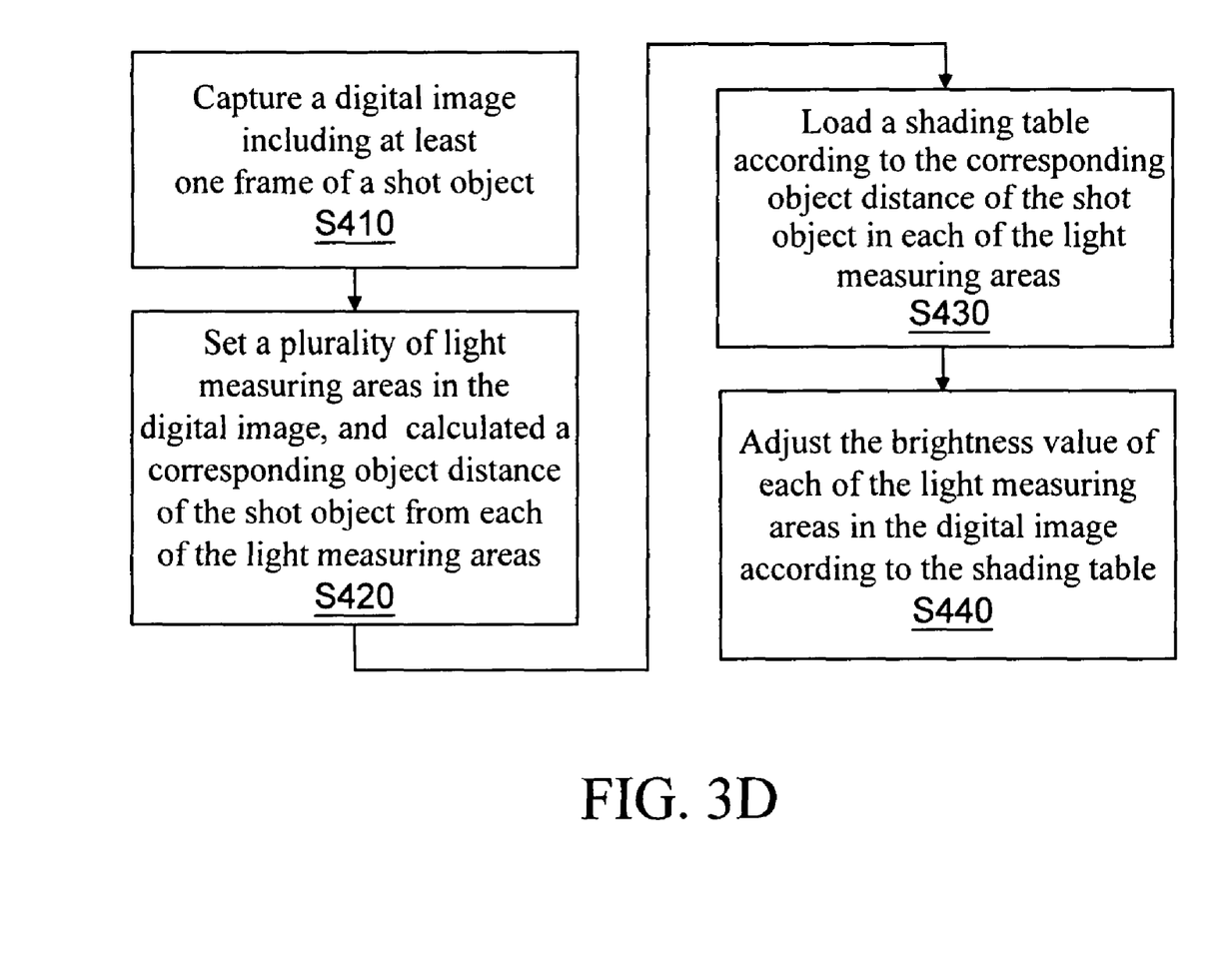
FIG. 3D is a flow chart of the loading operation of a shading table.

During shooting, the digital image capture device loads in the shading table at a suitable time according to the current object distance of the shot object, so as to compensate the brightness of the shot object. FIG. 3D is a flow chart of the loading operation of the shading table, including the following steps.

In Step S410, a digital image including at least one frame of a shot object is captured.

In Step S420, a plurality of light measuring areas is set in the digital image, and a corresponding object distance of the shot object is calculated from each of the light measuring areas.

In Step S430, a corresponding shading table is loaded according to the corresponding object distance of the shot object.

In Step S440, the brightness value of each of the light measuring areas in the digital image is adjusted according to the shading table.

Figure 4:
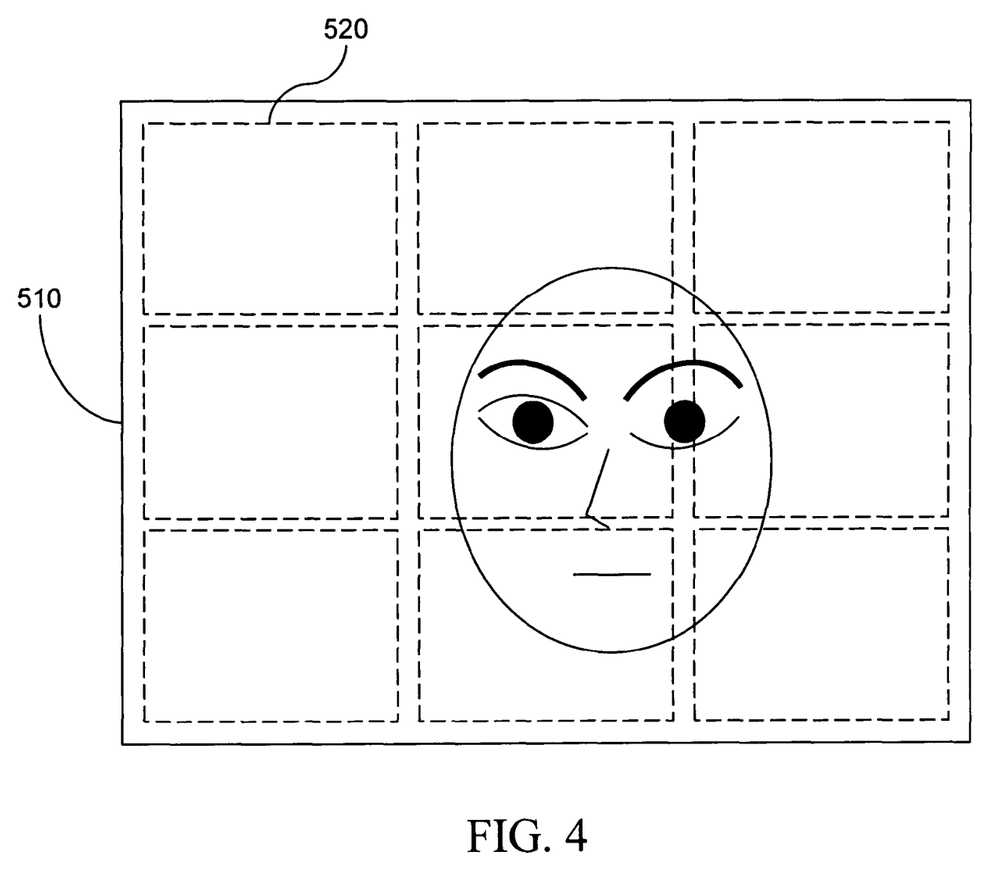
FIG. 4 is a schematic view of a digital image with light measuring areas.
Figure 5:
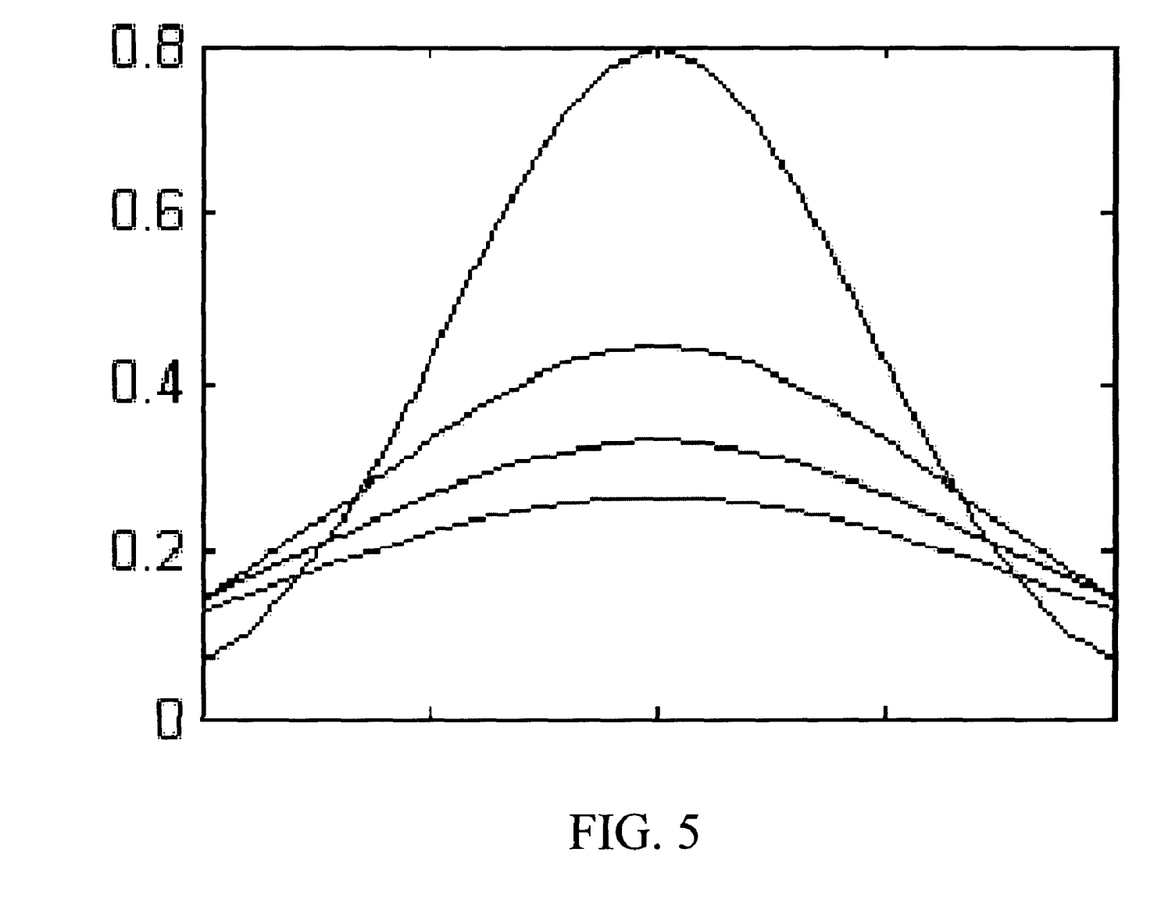
FIG. 5 is a schematic curved diagram showing the relationship between a brightness correction value and a distance of a shot object.

FIG. 4 is a schematic view of a digital image with light measuring areas. The number and coverage of the light measuring areas are not limited to the aspect in FIG. 4. The compensation ratio of each of the light measuring areas (indicated by dotted line frames 520 in FIG. 4) in the digital image (indicated by a solid line frame 510 in FIG. 4) is determined according to the distance between the light measuring area in the center and the light measuring areas on the periphery as well as the brightness differences there-between. For example, the farther the shot object is, the higher the brightness correction value will be, and vice versa. FIG. 5 is a schematic curved diagram showing the relationship between the brightness correction value and the distance of the shot object. The distance of the shot object, the brightness difference, and the compensation ratio are in positive correlation. That is, the farther the shot object is, the greater the brightness difference will be, so that the compensation ratio of the shot object is also increased.

In order to explicitly describe the operation of the present invention, the following implementation aspect is used for illustration. First, the digital image capture device 200 focuses on a first shot object and captures a pre-shot image. Then, the digital image capture device 200 triggers the strobe 220 and shoots a digital image. The output of the strobe is set at the main flash. The digital image capture device 200 estimates the object distance of the first shot object to the digital image capture device 200 according to the reflecting strength of the strobe 220 to the shot object. The digital image capture device 200 further divides the captured digital image into a plurality of light measuring areas. In the present invention, the central and surrounding light measuring areas are taken as an example. Other implementation aspects are already known to those skilled in the art, so the details will not be described herein again.

The digital image capture device 200 estimates the distance from the central light measuring area to the first shot object, and generates a light metering compensation value corresponding to the central light measuring area. Then, the digital image capture device 200 estimates the distances of other neighboring light measuring areas, and records the corresponding light metering compensations, respectively. The light measuring compensation values of the central and neighboring light measuring areas are estimated according to the distances from the shot object by means of interpolation calculation, as shown in FIG. 5. Moreover, in the present invention, after each of the light measuring areas is shot, a brightness correction value of each light measuring area is set correspondingly. After setting the brightness correction value of each of the light measuring areas, the brightness correction values are recorded in a shading table 241. In other words, the digital image capture device 200 calculates the corresponding shading table 241 at different object distances.

Afterward, the digital image capture device 200 shoots a second object, and repeats the above operations of setting a brightness correction value and establishing a shading table 241. The digital image capture device establishes the corresponding shading table 241 for different shot objects, so as to load in the corresponding shading table 241 directing to the shot objects with different distances/shooting magnifications.

The present invention provides a method for correcting the brightness of a digital image based on different light measuring areas in the digital image. According to the distances from the light measuring areas to the shot object, the digital image capture device 200 respectively sets a dedicated brightness correction value for each light measuring area and records the brightness correction values to a shading table 241. Directing to shot objects with different distances/shooting magnifications, the shading table 241 with the corresponding distance is loaded to prevent over-exposure of some areas of the digital image when a single gain value is employed to compensate the whole digital image.

What is claimed is:

1. A brightness correction method of a digital image capture device, applied to correct the brightness value of at least one digital image during shooting, the method comprising:
   capturing a pre-shot image comprising at least one frame of a shot object;
   triggering a strobe to emit a main flash onto the shot object, so as to shoot a digital image;
   setting a plurality of light measuring areas in the digital image;
   calculating a corresponding object distance of the shot object from each of the light measuring areas to obtain a plurality of object distances;
   establishing a shading table according to the plurality of object distances; and
   adjusting the brightness value of each of the light measuring areas in the digital image according to the shading table.

2. The brightness correction method of a digital image capture device according to claim 1, wherein the step of establishing the shading table according to the plurality of object distances further comprises:
   determining other object distances of another shot object; and
   establishing another shading table corresponding to the another shot object.

3. The brightness correction method of a digital image capture device according to claim 1, wherein the step of obtaining the plurality of object distances further comprises:
   comparing a brightness difference value of the light measuring area at the same location in the pre-shot image and the digital image; and
   calculating the corresponding object distance of the shot object in each of the light measuring areas according to the brightness difference value to obtain the plurality of object distances.

4. A digital image capture device with brightness correction, adapted to correct the brightness value of a shot object in a digital image through the compensation of a strobe during shooting, the device comprising:
   a lens set, for adjusting a focal length and a zoom ratio of the shot object;
   a light sensing element, electrically connected to the lens set, for receiving an image signal of the shot object through the lens set;
   a storage unit, electrically connected to the light sensing element, for storing the digital image received by the light sensing element and a shading table; and
   a processing unit, electrically connected to the strobe, the light sensing element, and the storage unit, for adjusting an output value of the strobe according to the shading table established through pre-shooting.

* * * * *